Aug. 7, 1951          LE ROY A. GRIFFITH          2,563,281
              LIQUID MEASURING CONDENSER
                  Filed April 15, 1946
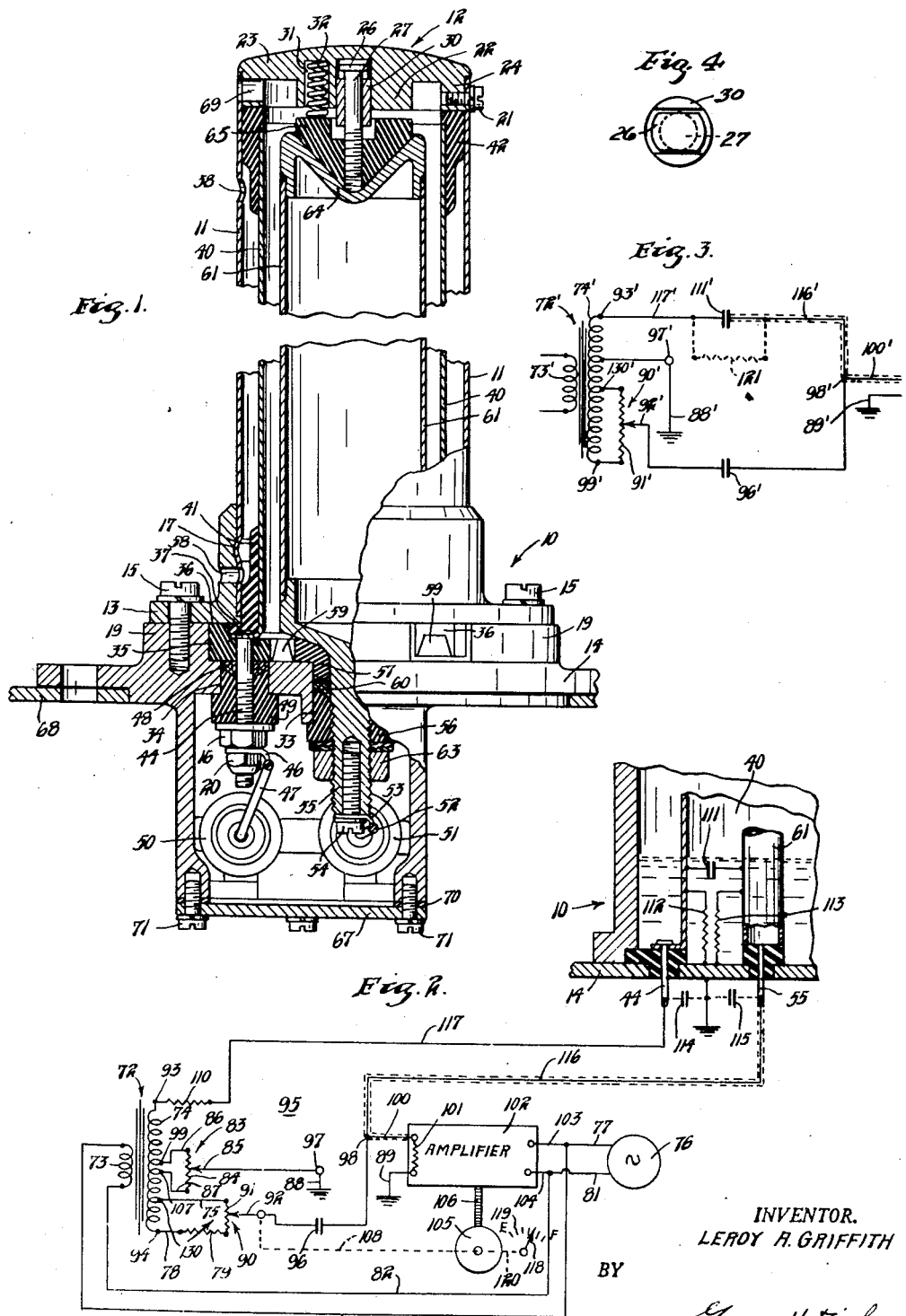
INVENTOR.
LEROY A. GRIFFITH
BY
George H. Fisher
ATTORNEY Patented Aug. 7, 1951

2,563,281

UNITED STATES PATENT OFFICE 2,563,281

LIQUID MEASURING CONDENSER

Le Roy A. Griffith, Minneapolis, Minn., assignor to Minneapolis-Honeywell Regulator Company, Minneapolis, Minn., a corporation of Delaware Application April 15, 1946, Serial No. 662,180

5 Claims. (Cl. 175—41.5)

This invention relates to the field of instruments for the measurement of liquid fuel, and more particularly to the sensing or pickup units of such systems, especially units in which variation in the amount of fuel causes change in the capacitance of a measuring condenser.

In the normal operation of vehicles using liquid fuel, for example aircraft, a certain amount of water gradually appears in the gasoline tank, derived mostly by condensation from atmospheric air drawn into the tank to replace fuel used during flight. Condensation also takes place in the tanks of aircraft which are grounded for extended periods. Being heavier than gasoline, the water naturally takes its place at the bottom of the tank, and in the course of time a sufficient quantity of water may collect so that its level reaches to the sensing units of the fuel measuring system. Such water is of course drained out of the tanks at necessary intervals, but if the level of water has reached the sensing units, an aqueous film remains on them after the tank is drained. This is particularly undesirable in condenser type pickup units, since the resistivity of water is widely at variance with that of gasoline, and the instrument therefore gives readings of fuel quantity which are inaccurate to an extent determined principally by the ohmic losses in the pickup due to the water film.

It is an object of this invention to provide a capacity pickup for a liquid fuel measuring system in which the effect on the indication of the system of ohmic losses in the pickup unit is minimized.

It is another object of the invention to provide a capacity pickup unit comprising concentric cylindrical electrodes mounted on and insulated from a support member, the electrodes and the member being in direct contact with the fuel.

Various other objects, advantages and features of novelty which characterize my invention are pointed out with particularity in the claims annexed hereto and forming a part hereof. However, for a better understanding of the invention, its advantages, and objects obtained by its use, reference should be had to the subjoined drawing, which forms a further part hereof, and to the accompanying descriptive matter, in which I have illustrated and described a preferred embodiment of my invention. In the drawing, Figure 1 is a sectional elevation of an embodiment of a pickup unit according to the invention, Figure 2 is a schematic wiring diagram showing the unit in use in a complete measuring system, Figure 3 is a disclosure of the normal arrangement in prior art devices, and Figure 4 is a top view of the screw head and bushing shown in Figure 1.

Referring first to Figures 1 and 2, there is shown a sensing unit 10 comprising a cylindrical housing 11 having a closure 12 at one end and a flange 13 at the other end. Housing 11 is mounted by conventional threaded means 15 on circumferentially spaced bosses 19 projecting from a base member 14. Flange 13 is fastened to housing 11 by any suitable means: Figure 1 shows a spun interlock 17, and additional rigidity may be given to the structure by spot welding if desired.

End closure 12 is fastened to housing 11 by conventional threaded means 21, and is shown to comprise a central boss 22 connected by a flange 23 with an outer ring 24: radial apertures are formed in ring 24. A hollow bushing 30 is tightly pressed into a central aperture in boss 22, and is freely traversed by a screw 27. As is shown in Figure 4 the bushing is slotted transversely at one end to provide a non-circular recess bordered on two sides by arcuate sectors of the bushing, and the head 26 of screw 27 is shaped to be received within the opening so formed. The non-circular shape of the aperture prevents the screw from turning independently of bushing 30 and hence of closure 12, but permits axial displacement of the screw. A plurality of further openings 31 are provided in boss 22, each of which receives a spiral spring 32, for a purpose presently to be described.

Member 14 is provided with a centrally disposed aperture 33 of circular cross-section, and an eccentrically disposed aperture 34, also of circular cross-section extending in the direction of housing 11. The member is also provided with an annular recess 35 partially occupied by an annular insulating member 36. Member 36 in turn is annularly recessed to receive the flange 37 of a first cylindrical electrode 40 which fits within a first annular insulating member 41 at its end nearest member 14, and within a second annular insulating member 42 at its end nearest closure 12.

Member 41 has an out-turned flange portion which is engaged between flange 13 and insulating member 36 of member 14, so that electrode 40 is held firmly against axial movement with respect to member 14. A stud 44 secured to flange 37 traverses member 36 and the eccentrically disposed opening 34 in member 14, being spaced therefrom by a suitable insulating member 49 and a packing gland 48, so that by tightening a first nut 16, gland 48 is compressed between members 49 and 36, providing a fluid tight seal for aperture 34 and fastening electrode 40 rigidly to member 14. A second nut 20 secures to stud 44 a lug 46 to which electrical connection is made by a wire 47 from a conventional electrical connector 50. Member 36 is provided with apertures 59, arranged to coincide with the spaces between bosses 19, to admit the fluid to be measured into the space within the electrode.

A second electrical connector 51 is joined by a conductor 52 with a lug 53 fastened by suitable means 54 to a second stud 55 which traverses the centrally disposed aperture 33 in member 14 through suitable insulating discs 56 and 57 and a packing gland 69. At its inner end stud 55 is enlarged to cooperate with a second cylindrical electrode 61, to which it is shown as fastened by welding, and at its outer end stud 55 threadedly engages a nut 63, so that by tightening nut 63 gland 60 is compressed between members 57 and 56, and the whole assembly is clamped firmly to member 14.

The end of electrode 61 remote from member 14 is welded to a conically recessed disc 64, interfitting with a convexly conical insulating member 65 which threadedly engages with screw 27 previously recited, so that the outer ends of springs 32 engage the base of member 65. Thus, when the unit is assembled, member 65 engages recess 64, in resilient fashion, due to the compression of coil springs 32, the head 26 of machine screw 27 taking up a position intermediate the extremes of its possible travel axially of bushing 30. A plurality of radial openings 69 provide means of egress for air being replaced in the space between electrodes 40 and 61 by fluid entering the space through apertures 59.

Housing 11 is provided with openings 58 to prevent trapping of condensate or fuel between it and electrode 40.

The unit is completed by the provision of a cover plate 67 fastened to member 14 in watertight fashion by any suitable means such as gasket 70 and machine screws 71, and is mounted in the bottom of a container 68 so that electrodes 40 and 61 are within the container, and so that member 14 seals the hole in the container through which connectors 50 and 51 and their housing project.

Since the invention in the present application resides in the sensing unit per se and in the manner in which it is placed into a circuit, the circuit of a complete system using the sensing unit shown in Figure 2 is given schematically, but omits many refinements known to those skilled in the art. In general the system is closely related to the subject matter of the copending application of Curtiss R. Schafer et al., Serial No. 575,168, filed January 29, 1945, and assigned to the assignee of the present application, but my invention is an improvement on the structure there shown and embodies novel features of structure and arrangement to give improved function over the earlier arrangement.

In Figure 2, there is shown a transformer 72 having a primary winding 73 and a secondary winding 74 having end terminals 93 and 94 and intermediate taps 99, 107 and 130. Primary winding 73 is energized with alternating current from a suitable source 76 through conductors 77 and 80 and conductors 81 and 82. The circuit is shown to include a first "empty calibration" potential divider 83 having a winding 84 and a slider 85, and energized from taps 99 and 107 of winding 74 of transformer 72 through conductors 86 and 87. There is also provided a second "rebalancing" potential divider 90 having a winding 91 and a slider 92, winding 91 being energized from tap 130 and terminal 94 of secondary winding 74 of transformer 72 through conductor 75, conductor 78, and a "full calibration" variable resistor 79.

Potential dividers 83 and 90 comprise a portion of a balanceable network 95 which also includes unit 10, as a measuring capacitor, and a comparison capacitor 96. The output terminals of the network are indicated at 97 and 98, the former being grounded. Ground connections 88 and 89 and shielded conductor 100 serve to connect across the output terminals of the network a resistor 101 comprising the input resistance of an amplifier 102, the latter being shown as energized from source 76 by conductors 77 and 103 and conductors 81 and 104. Amplifier 102 is also shown as energizing a motor 105 through a multiconductor cable 106.

Motor 105 is shown as actuating slider 92 of potential divider 90 through a suitable mechanical connection 108. The motor also actuates a movable index 118 across a fixed scale 119 by means of a suitable mechanical connection 120.

The mechanical structure of unit 10 as shown in Figure 2 has been somewhat generalized, and there have been superimposed thereon symbols indicative of the electrical function of the unit. Thus, the capacitance between electrodes 40 and 61 has been indicated by condenser 111 and in addition to this capacitor there are shown a pair of resistors 112 and 113. The unit is connected with network 95 by a shielded conductor 116 and by a limiting resistor 110 and an unshielded conductor 117: each of these conductors has capacity to ground and these capacitances are indicated by condensers 114 and 115.

*Operation*

It will be apparent that, upon energizing the system shown in Figure 2 from source 76, alternating voltages of the same phase are supplied by transformer action between the upper and lower terminals of the windings of the potential dividers. A sensing circuit may be traced through the network from the terminal 93 of winding 74 through resistor 110, conductor 117, unit 10, shielded conductor 116, output terminal 98, shielded conductor 100, input resistor 101 of amplifier 102, ground connections 89 and 88, and output terminal 97 to slider 85. A comparison circuit may likewise be traced from slider 85 of potential divider 83 through output terminal 97, ground connections 88 and 89, input resistor 101, shielded conductor 100, output terminal 98, and comparison condenser 96, to slider 92.

Load resistor 101 is common to both the sensing circuit and the comparison circuit, but it will be evident that the sensing current and the comparison current in input resistor 101 are 180 degrees out of phase. When the sensing current and the comparison current are equal in magnitude, no potential difference is impressed on amplifier 102.

The voltage effective in the sensing circuit is determined by the position of slider 85, and the current through resistor 101 due to any particular voltage applied to the sensing circuit varies only with the impedance of unit 10, since the other elements in the circuit are constant. Similarly, the voltage effective in the comparison circuit is determined by the position of sliders 85 and 92 and the adjustment of resistor 79, the latter determining the current through winding 91 and therefore the maximum voltage drop obtainable along the winding. If the position of slider 85, the resistance of resistor 79, and the impedance of condenser 96 are all held constant, the current through resistor 101 due to the voltage applied to the comparison circuit varies only with movement of slider 92. Proper selection of circuit constants makes it possible for the sensing and comparison currents to be equal as previously described.

In originally setting up the instrument, the pickup is inserted into the tank in which it is to be used and fuel is admitted to the tank until it comes up to the lowest level from which fuel can usefully be drawn from the tank. Slider 85 is then adjusted until motor 105 comes to rest with slider 92 near the upper end of its travel and with pointer 118 at the "empty" graduation on scale 119. More fuel is now admitted, and the motor operates as fuel is being added until it stops in some position near the lower end of its travel when the tank is full. Resistance 79 is now varied to set pointer 118 at the "full" graduation on scale 119.

When the tank is full, the dielectric between cylinders 40 and 61 is almost entirely fluid, and the impedance of the pickup is minimum, allowing maximum flow of current in the sensing circuit. When the tank is empty the dielectric between cylinders 40 and 61 is almost entirely air, and the impedance of the pickup is maximum, allowing minimum flow of current in the sensing circuit.

Suppose the tank is partly full, and the motor is at rest: the sensing and comparison currents are equal and opposite, and there is no voltage impressed on the amplifier. Now let a certain quantity of fuel be added to the container in which sensing unit 10 is installed. The fuel replaces air as the dielectric of a portion of the capacitor, thus increasing the average dielectric constant and the capacitance of the capacitor and decreasing its impedance. The magnitude of the current in the sensing circuit is thus increased so that it no longer equals that of the current in the comparison circuit, and a voltage in phase with the source appears between terminals 97 and 98 of the network and is impressed on amplifier 102.

Amplifier 102 may be any suitable motor control amplifier adapted to energize a motor for forward or reverse operation according as the phase of an input voltage is the same as or opposite to the phase of a standard voltage: such amplifiers are well known in the art, and amplifier 102 is therefore not shown in detail. The effect of impressing the unbalance voltage of the network, just described, on the amplifier is to energize motor 105 for operation in a first or "forward" direction, displacing index 118 along scale 119 toward its "full" position, and at the same time moving slider 92 downwardly along winding 91, and thus increasing the voltage between sliders 85 and 92. When this voltage is just large enough to cause the current in the comparison circuit to equal that in the sensing circuit, the voltage impressed on the amplifier disappears, and operation of motor 105 is interrupted.

If now fuel is withdrawn from the container by drainage or for use, the average dielectric constant of the sensing condenser decreases, thus decreasing its capacitance and increasing its impedance. The current in the comparison circuit now exceeds the current in the sensing circuit, and a voltage appears between terminals 97 and 98 of the network which is of the opposite phase to that appearing under the former condition. Impressing this voltage on amplifier 102 results in operation of motor 105 in a second or "reverse" direction which is opposite to that in which it formerly operated, moving pointer 118 along scale 119 towards its "empty" position, and moving slider 92 upward along 91 to decrease the voltage applied to the comparison circuit and thus decrease the comparison current. When the two currents in resistor 102 are again equal, operation of motor 105 is again interrupted.

An understanding of the basic operation of the system having been reached, it is now possible to point out the manner in which my improved system, comprising the subject matter of this application, differs from systems previously disclosed. It will be observed by reference to Figure 2 that fluid between electrode 40 and electrode 61 is in direct contact with member 14, which in turn is grounded. In prior art structures, the arrangement is such that not only are electrodes 40 and 61 insulated from member 14, but the member is substantially completely overlaid with an insulating layer, so that the leakage path between the condenser plates comprises large areas of dielectric without any intermediate grounded conducting portions. The electrical functioning of this prior art structure is shown in simplified form in Figure 3, in which parts identical with parts shown in Figure 2 are given the same reference numeral primed. It will be seen that the principal difference between Figure 2 and Figure 3 is to be found in the relationship between the resistors associated with condenser 111 and the resistor associated with condenser 111'. These resistors represent the leakage losses in the condensers, and as is shown in Figure 3, the resistance 121 is effectively in parallel with the capacitor, while in Figure 2, the resistances 112 and 113 are in effect connected between the opposite plates of the capacitor and ground. It will be appreciated that so long as the dielectric of the capacitor has an extremely high ohmic impedance, as is generally the case with fluid fuel, the circuits are essentially identical, but when a relatively low impedance path such as that caused by a water film on the pickup parts is introduced between the plates of the capacitor, the effect on a circuit such as that shown in Figure 3 is to seriously alter the impedance in the sensing arm of the network, as well as shifting the phase of the current flowing therethrough, thus bringing about serious errors in the indication of the system.

Where the film is in electrical contact with the grounded member 14 of the pickup unit, however, the ohmic resistance is no longer in parallel with the capacitor, but comprises two portions as indicated by resistors 112 and 113. A study of the circuit shows the resistor 112 is essentially connected in parallel with the portion of winding 74 above slider 85. Accordingly, if the regulation of the transformer is good, variation in the magnitude of resistance 112 will have little effect on the impedance of the sensing arm of the network, and therefore will have little effect on the indication of the instrument.

In a similar fashion the resistance of resistor 113 is effectively in parallel with the input circuit of the amplifier, rather than across the capacitance 111. Within reasonable limits the only effect of this resistance is to slightly reduce the sensitivity of the amplifier, and its effect on the indication of the instrument is therefore much less than the effect of a corresponding resistance directly across the plate of capacitor 111.

It will be appreciated that the sensing units in a fuel measuring system such as that here disclosed are located in the fuel tanks of the vehicle, generally in the wings of the craft, while the amplifier, indicator, etc., are located at some central position to give supervision of the fuel supply of the vehicle in coordination with other available data. This means that conductors 116 and 117 must be of considerable length, and this in turn increases the capacitance of each of these conductors with respect to ground as is suggested by capacitors 114 and 115 in Figure 2. It will be apparent however that, just as in the case of the resistors 112 and 113, capacitors 114 and 115 respectively are effectively in parallel with the portion of winding 74 above slider 85 and with the input to amplifier 102, respectively, and therefore affect only the sensitivity of the instrument and not the actual unbalance of the network.

From the foregoing description, it will be apparent that I have greatly improved known fuel measuring systems by providing means for minimizing the affect on the indication of the system of the presence in the indicator of undesired fluid having conductivity characteristics which may differ widely from that of the fluid being measured.

Numerous objects and advantages of my invention have been set forth in the foregoing description, together with details of the structure and function of the invention, and the novel features thereof are pointed out in the appended claims. The disclosure, however, is illustrated only, and I may make changes in detail, especially in matters of shape, size, and arrangement of parts, within the principle of the invention, to the full extent indicated by the broad general meaning of the term in which the appended claims are expressed.

I claim as my invention:

1. A capacitor for insertion into an opening in the bottom of a container of dielectric fluid comprising in combination, an electrically conductive base member adapted to sealingly close said opening, a first condenser plate, first insulating means resting on said member and mounting said first plate above said member, a second condenser plate substantially enveloping said first plate, second insulating means resting on said member and spaced from said first insulating means and mounting said second plate above said member, said insulating means and said member cooperating to provide a surface leakage path between said plates which at all points includes a portion of said member, said capacitor being formed with a passage through a portion thereof to admit fluid into the space between said plates.

2. A capacitor for insertion into an opening in the bottom of a container of dielectric fluid comprising in combination, an electrically conductive base member adapted to sealingly close said opening, inner and outer concentric cylindrical condenser plates, an insulating disc mounting said inner plate on said member, an insulating annulus mounting said outer plate on said member so that a surface leakage path between said plates is provided which at all points includes a portion of said member, said capacitor being formed with a passage through a portion thereof to admit fluid into the space between said plates.

3. A tank unit for liquid fuel measuring equipment comprising in combination: an electrically conductive support member; a cylindrical housing mounted on said support member in electrical contact therewith to comprise a unit for fluid tight insertion through the bottom of a container of fuel; a first cylindrical electrode; first insulating means mounting said first electrode on said member; second insulating means supporting said first electrode in concentric alignment with said housing; a second cylindrical electrode; third insulating means mounting said second electrode on said member so as to provide a leakage path between said electrodes which at all points includes said first and third insulating means and a portion of said support member; insulating means resiliently supporting said second electrode in concentric alignment with said housing; means making electrical connection with said electrodes; said third insulating means having apertures and being spaced from said first insulating means in such a manner as to admit said fluid into the space between said electrodes to contact said electrodes and said member and to replace air as the dielectric of a condenser including said electrodes.

4. A capacitor for insertion into an opening in the bottom of a container of dielectric fluid comprising in combination, a closure member for attaching said capacitor to the container and adapted to sealingly close said opening, said closure member including an electrically conductive annular portion, a first condenser plate, a second condenser plate substantially enveloping said first plate, and insulating means resting on said closure member and having spaced portions for supporting said first and second condenser plates above said closure member, said spaced portions of said insulating means forming the walls of a recess between said plates with said electrically conductive annular portion at the bottom of the recess to provide a surface leakage path between said plates which at all points includes a portion of said electrically conductive annular portion, said capacitor being formed with a passage through a portion thereof to admit fluid into the space between said plates.

5. A capacitor for insertion into an opening in the bottom of a container of dielectric fluid comprising in combination, an electrically conductive base member adapted to sealingly close said opening, a first condenser plate, first insulating means resting on said member and mounting said first plate above said member, said first condenser plate having a central extension extending through said first insulating means for clamping said first plate in position and for providing one electrical terminal, a second condenser plate substantially enveloping said first plate, and second insulating means resting on said member and spaced from said first insulating means and mounting said second plate above said member, said second condenser plate having a plurality of fastening members extending therefrom through said second insulating means and one of which provides a second electrical terminal, said insulating means and said member cooperating to provide a surface leakage path between said plates which at all points includes a portion of said member, said capacitor being formed with a passage through a portion thereof to admit fluid into the space between said plates.

LE ROY A. GRIFFITH.

REFERENCES CITED

The following references are of record in the file of this patent:

UNITED STATES PATENTS

| Number | Name | Date |
| --- | --- | --- |
| 1,882,316 | Cleary | Oct. 11, 1932 |
| 1,962,796 | Wappler | June 12, 1934 |
| 2,188,628 | Freystedt | Jan. 30, 1940 |
| 2,374,084 | Dubilier | Apr. 17, 1945 |

FOREIGN PATENTS

| Number | Country | Date |
| --- | --- | --- |
| 441,576 | Great Britain | Jan. 22, 1936 |